(12) United States Patent
Campagnolo

(10) Patent No.: US 7,540,216 B2
(45) Date of Patent: *Jun. 2, 2009

(54) ELECTRICAL CONTROL DEVICE FOR MOTOR DRIVEN DERAILLEUR FOR BICYCLE

(75) Inventor: Valentino Campagnolo, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/363,342

(22) Filed: Feb. 27, 2006

(65) Prior Publication Data

US 2006/0162477 A1    Jul. 27, 2006

Related U.S. Application Data

(63) Continuation of application No. 10/632,777, filed on Aug. 1, 2003, now Pat. No. 7,017,440, which is a continuation of application No. 09/873,377, filed on Jun. 5, 2001, now Pat. No. 6,619,154.

(30) Foreign Application Priority Data

Jun. 6, 2000    (IT)    ............... TO2000A0540

(51) Int. Cl.
    *F16C 1/10*      (2006.01)
    *G05G 11/00*      (2006.01)
    *G05G 13/00*      (2006.01)

(52) U.S. Cl. ....................... 74/502.2; 74/489

(58) Field of Classification Search .............. 74/502.2, 74/484 R, 473.13, 473.14, 489, 501.6; 474/17, 474/78–82; 192/217; 701/70; 188/24.11; 340/432

See application file for complete search history.

(56) References Cited

U.S. PATENT DOCUMENTS

| | | | |
|---|---|---|---|
| 4,071,892 A | 1/1978 | Genzling |
| 4,143,557 A | 3/1979 | Wakebe et al. |
| 4,490,127 A | 12/1984 | Matsumoto et al. |
| 4,605,240 A | 8/1986 | Clem et al. |
| 4,946,425 A | 8/1990 | Buhlmann |
| 5,213,548 A | 5/1993 | Colbert et al. |
| 5,358,451 A | 10/1994 | Lacombe et al. |
| 5,470,277 A | 11/1995 | Romano |
| 5,479,776 A | 1/1996 | Romano |
| 5,480,356 A | 1/1996 | Campagnolo |
| 5,494,307 A | 2/1996 | Anderson |
| 5,514,041 A | 5/1996 | Hsu |
| 5,519,378 A | 5/1996 | Queensbury |
| 5,625,336 A | 4/1997 | Yamamoto |
| 5,653,649 A | 8/1997 | Watarai |
| 5,670,988 A | 9/1997 | Tickle |

(Continued)

FOREIGN PATENT DOCUMENTS

DE      3136922      3/1983

*Primary Examiner*—Vinh T. Luong
(74) *Attorney, Agent, or Firm*—Volpe and Koenig, P.C.

(57) ABSTRACT

An electrical control device for a motor-driven derailleur for bicycles. The control device has a supporting body adapted for attachment to the handlebars of the bicycle. A brake lever is mounted on the supporting body so that it can oscillate. A pair of switches, for controlling gear change, are carried by the supporting body. The switches are preferably mounted on a supporting plate that is located on the supporting body. Preferably, the switches are pre-assembled on the support plate before the plate is positioned on the supporting body.

19 Claims, 4 Drawing Sheets

U.S. PATENT DOCUMENTS

| | | |
|---|---|---|
| 5,676,021 A | 10/1997 | Campagnolo |
| 5,728,017 A | 3/1998 | Bellio et al. |
| 5,806,372 A | 9/1998 | Campagnolo |
| 5,865,454 A | 2/1999 | Campagnolo |
| 5,900,705 A | 5/1999 | Kimura |
| 6,015,036 A | 1/2000 | Fukuda |
| 6,031,190 A | 2/2000 | Tokuda et al. |
| 6,069,788 A | 5/2000 | Masui |
| 6,073,730 A | 6/2000 | Abe |
| 6,129,580 A | 10/2000 | Kishimoto |
| 6,142,281 A | 11/2000 | Campagnolo |
| 6,146,297 A | 11/2000 | Kimura |
| 6,216,078 B1 | 4/2001 | Jinbo et al. |
| 6,521,851 B2 | 2/2003 | Handa et al. |
| 6,698,567 B2 * | 3/2004 | Dal Pra' ............... 192/217 |
| 6,917,283 B2 * | 7/2005 | Takeda ............... 340/432 |
| 7,007,785 B2 * | 3/2006 | Uno et al. ............... 192/217 |
| 7,080,723 B2 * | 7/2006 | Uno et al. ............... 192/217 |
| 2005/0016312 A1 * | 1/2005 | Dal Pra' ............... 74/484 R |
| 2008/0210046 A1 * | 9/2008 | De Perini ............... 74/502.2 |

* cited by examiner

ELECTRICAL CONTROL DEVICE FOR MOTOR DRIVEN DERAILLEUR FOR BICYCLE

CROSS REFERENCE TO RELATED APPLICATIONS

This application is a continuation of and claims priority to U.S. Pat. No. 6,619,154 issued Sep. 16, 2003 and U.S. application Ser. No. 10/632,777 filed Aug. 1, 2003 which are hereby incorporated by reference herein as if fully set forth in its entirety. This application also claims benefit of and priority to Italian Patent Application TO2000A000540, filed Jun. 6, 2000.

BACKGROUND OF THE INVENTION

The present invention relates to an electrical control device for a motor-driven derailleur for bicycles.

More precisely, the invention relates to a control device of the type comprising:
- a supporting body provided-with means for fixing it to the handlebars of a bicycle;
- a brake lever mounted on the supporting body in such a way that it can oscillate about a first axis;
- a pair of electrical switches for controlling gear change, which are carried by the supporting body; and
- a gear lever which can be operated manually for controlling one of said switches.

A control device of the type specified above is known from the U.S. Pat. No. 5,470,277 in the name of the present applicant, which describes an electrical control device provided with two switches set in a supporting body fixed to the handlebars of a bicycle. One first switch is operated by a gear lever set immediately behind the brake lever, and a second switch is operated by means of a push-button located on a side wall of the supporting body. The two electrical switches make it possible to actuate an electric motor associated to a derailleur for bicycles in two opposite directions. Actuation of the motor of the derailleur in one first direction makes it possible to obtain shifting of the chain in one first direction, for example towards the higher gear ratios, whilst actuation of the motor in the opposite direction corresponds to shifting of the chain in the opposite direction, for example towards the lower gear ratios.

The document U.S. Pat. No. 6,015,036 describes an electrical control device for a bicycle including a switch for controlling gear change, which is supported by the brake lever. A second switch for controlling gear change may be set in the vicinity of the brake lever. This solution is not as advantageous as the one in which both of the switches are set on the supporting body in so far as it entails the need to bring an electrical connection onto the brake lever, which oscillates with respect to the supporting body.

The purpose of the present invention is to provide a an electrical control device of an improved type which is simple from the constructional standpoint and has greater functionality than known devices.

BRIEF SUMMARY OF THE INVENTION

According to the present invention the above purpose is achieved by a control device having a support body with a brake lever movably attached thereto, first and second electrical switches located in the support body, a control lever mounted in the support body which is rotated into contact with the first electrical switch, and a button disposed on the support body for activating the second electrical switch. A gear change mechanism in communication with the first and second electrical switches increases or decreases a gear ratio when either the first or second electrical switch is activated.

BRIEF DESCRIPTION OF THE DRAWINGS

The present invention will now be described in detail with reference to the attached drawings, which are furnished purely by way of non-limiting example, and in which.

DETAILED DESCRIPTION OF THE PREFERRED EMBODIMENTS

Figure 1:
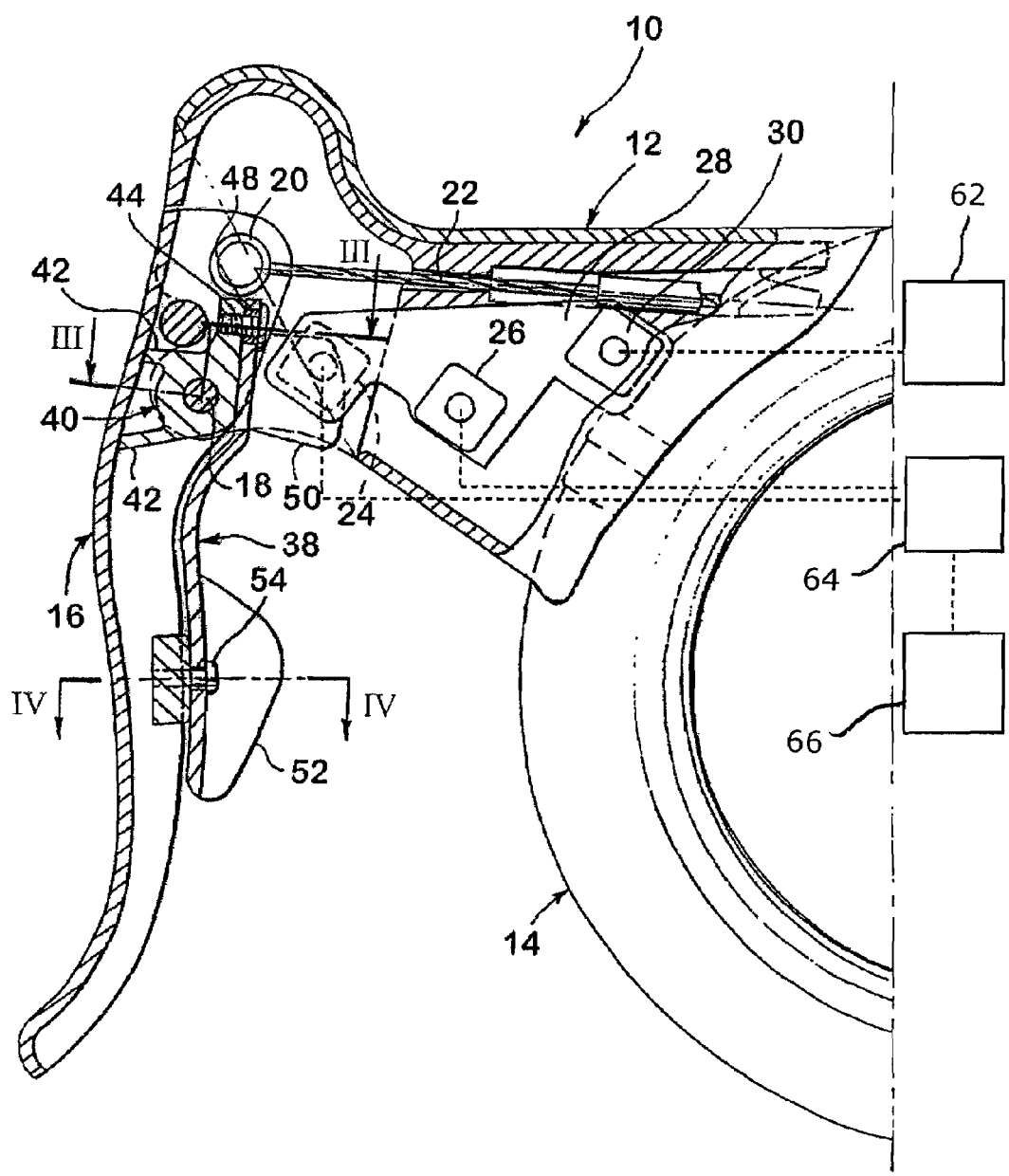
FIGS. 1 and 2 are side sectional views of a control device according to the present invention in two operating positions.

With reference to the drawings, the number 10 designates an electrical control device for a motor-driven derailleur for bicycles. The control device according to the present invention can be used for controlling a motor-driven gear change, for example of the type described in the U.S Pat. No. 5,470,277 in the name of the present applicant.

The control device 10 comprises a supporting body 12 provided with means of a conventional type for its fixing to a bicycle handlebars 14. The control device 10 comprises a brake lever 16 which is articulated to the supporting body 12 by means of a pivot 18. One end 20 of a brake cable 22 is anchored in a conventional way to a top portion of the brake lever 16. As may be seen in FIGS. 1 and 2, the brake lever 16 may be made to oscillate manually about the pivot 18 for controlling the bicycle brake, in an altogether conventional way.

The supporting body 12 carries a pair of electrical switches, designated by 24 and 26, for controlling gear change. Preferably the said switches are set on opposite faces of a supporting plate 28 fixed to the supporting body 12. In the example of embodiment illustrated in the figures, the supporting plate 28 also carries a third switch 30 designed to control a cycle-computer 62. The first switch 24 is designed to operate an electrical motor 64 for controlling a gear change in one first direction corresponding, for example, to shifting of the chain towards higher gear ratios. Operation of the second switch 26 causes actuation of the motor in the opposite direction, corresponding, for example, to shifting of the chain towards lower gear ratios. The control device 10 can be used indifferently for controlling the front derailleur or the rear derailleur 66 of a bicycle. Consequently, in the control device set on the right-hand side of the bicycle handlebars (usually designed to control the rear derailleur), the switch 24 controls gear change towards lower gear ratios (i.e., shifting of the chain onto gear wheels with a greater number of teeth), whilst the switch 26 controls gear change towards higher gear ratios (i.e., shifting of the chain onto gear wheels with a smaller number of teeth). Instead, in the control device set on the left-hand side of the handlebars (usually designed to control the front derailleur), the situation is reversed; i.e.., the switch 24 controls gear change towards higher gear ratios (i.e., towards a gear wheel driven by the bottom bracket with a greater number of teeth), whilst the switch 26 controls gear change towards lower gear ratios (i.e., towards a gear wheel driven by the bottom bracket with a smaller number of teeth).

Figure 3:
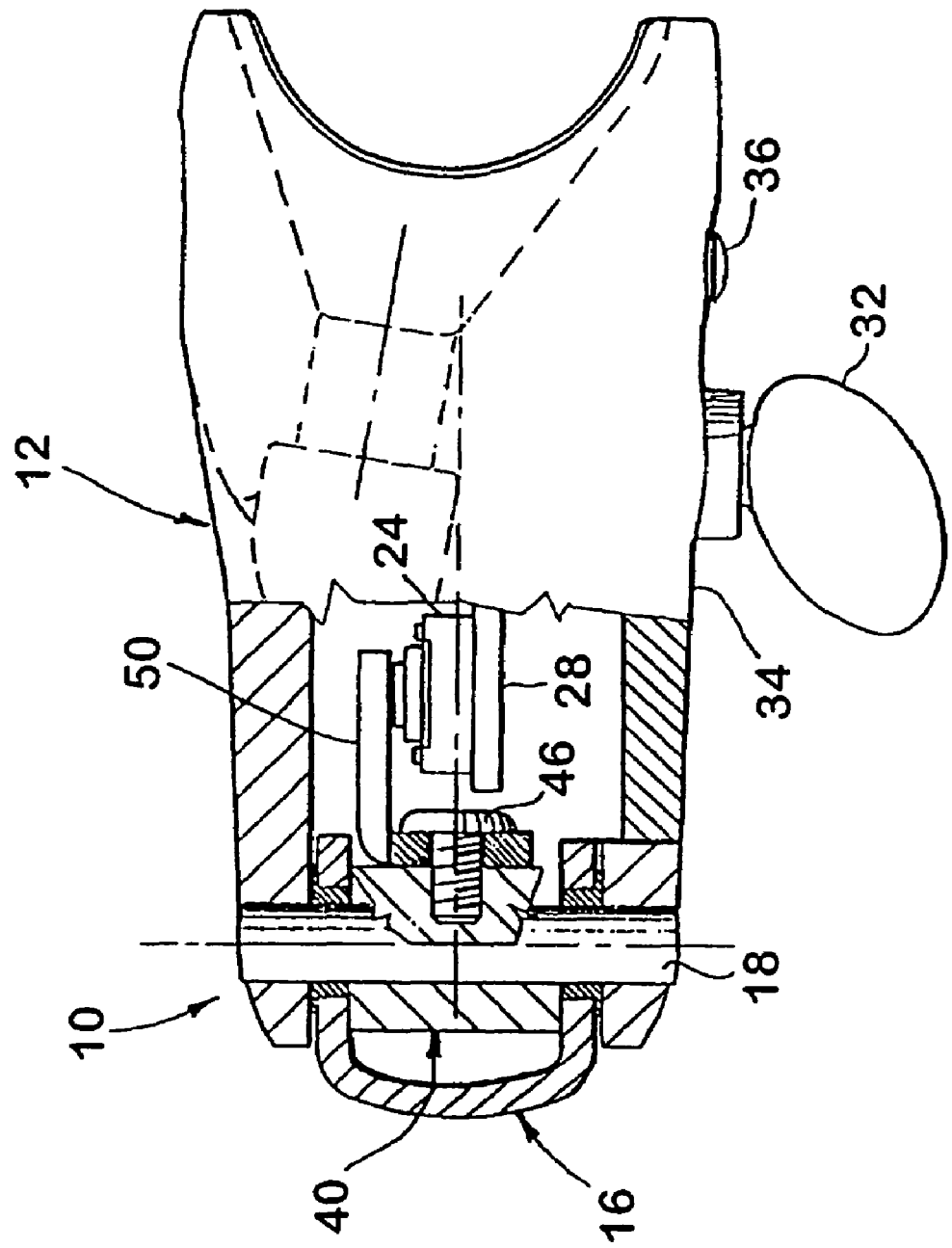
FIG. 3 is a cross section according to the line III-III of FIG. 1.

With reference to FIG. 3, the switch 26 is preferably controlled by means of a gear change switch, such as a push-button 32 set on one side of the supporting body 12, in a position such that it can be operated by the cyclist's thumb while the cyclist's hand engages the supporting body 12 or the curved part of the handlebars 14. Preferably, the push-button 32 has a control surface which is substantially orthogonal to a side wall 34 of the supporting body 12 and is articulated to said side wall 34 about an axis that is substantially orthogonal to the pivot 18.

Preferably, the switch 30 designed for operative control of the cycle-computer 62 can be actuated by means of a push-button that slightly projects from the side wall 34 of the supporting body 12 and is provided with a short operating travel in a direction substantially orthogonal to the side wall 34.

Figure 2:
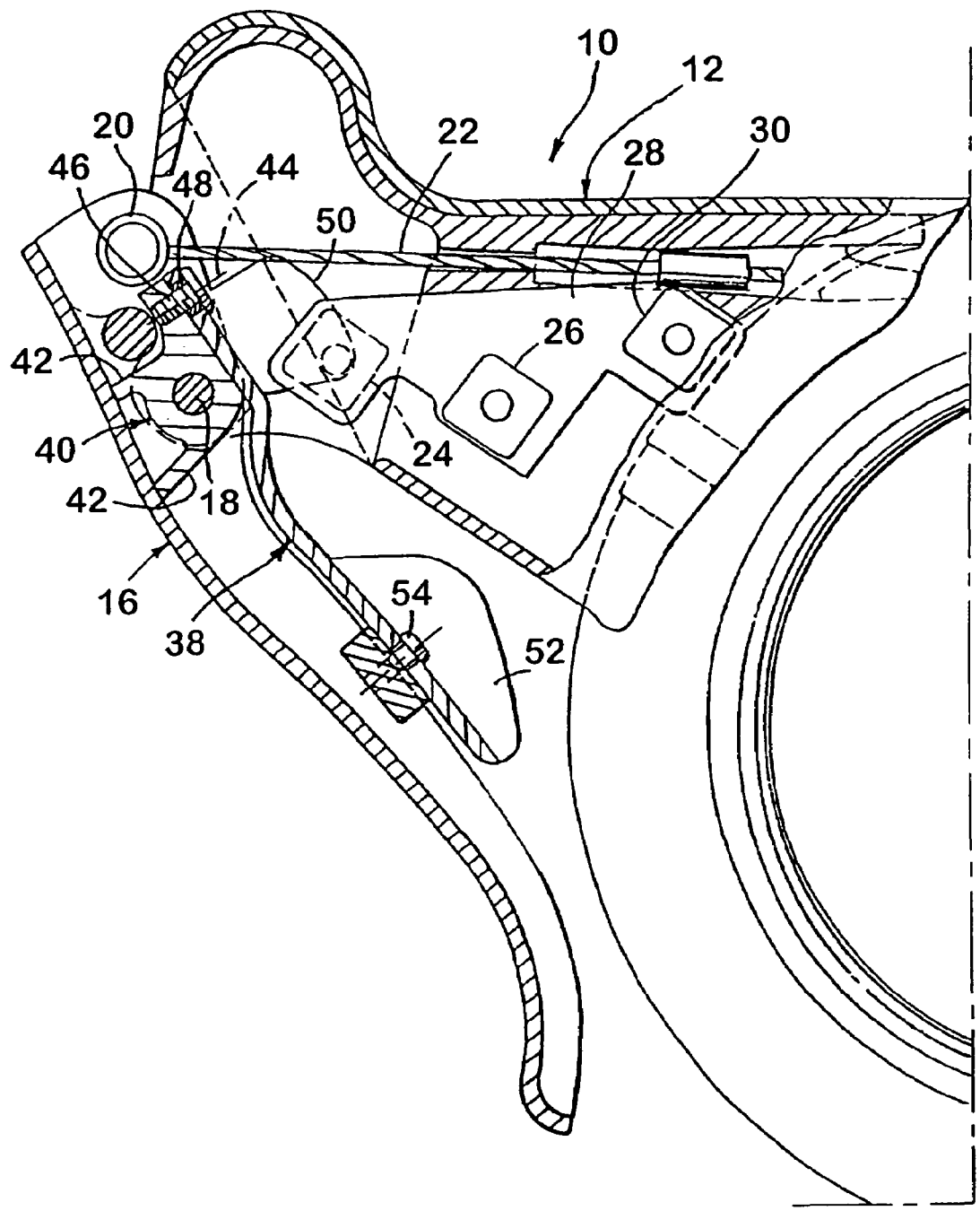

The control device according to the present invention comprises a gear lever 38 set immediately behind the brake lever 16. The control lever 38 is carried, so that it can oscillate, by an intermediate support 40, which in turn is mounted on the supporting body 12 in such a way that it oscillates about the axis of the pivot 18 of the brake lever 16. As may be seen in FIG. 3, the brake lever 16 has a substantially U-shaped cross section, and the intermediate support 40 is preferably housed inside the brake lever. The intermediate support 40 is free to rotate about the pivot 18. As illustrated in FIGS. 1 and 2, the intermediate support 40 rests against the internal surface of the brake lever 16 by means of a pair of projecting portions 42. Consequently, when the brake lever 16 is made to oscillate from the resting position, illustrated in FIG. 1, to a braking position, illustrated in FIG. 2, the intermediate support 40 oscillates together with the brake lever 16 about the pivot 18. The control lever 38 is articulated to the intermediate support 40 about an axis 44 which is substantially orthogonal to the axis of the pivot 18 of the brake lever. In the example illustrated in the figures, the articulated connection between the gear lever 38 and the intermediate support 40 is obtained by means of a screw 46 fixed to the intermediate support 40 and carrying a bushing 48 about which the lever 38 turns. The said lever 38 is therefore free to oscillate about the axis 44, and moreover oscillates about the axis of the pivot 18 together with the brake lever 16 during the braking movement, as illustrated in FIG. 2.

The gear lever 38 is provided with two flaps or tabs 50, 52 (which in the example illustrated are integral with the lever) constituting, respectively, a portion for actuating the switch 24 and a control portion on which it is possible to act manually for causing the lever 38 to oscillate about the axis 44 in the direction corresponding to the actuation of the switch 24.

Figure 4:
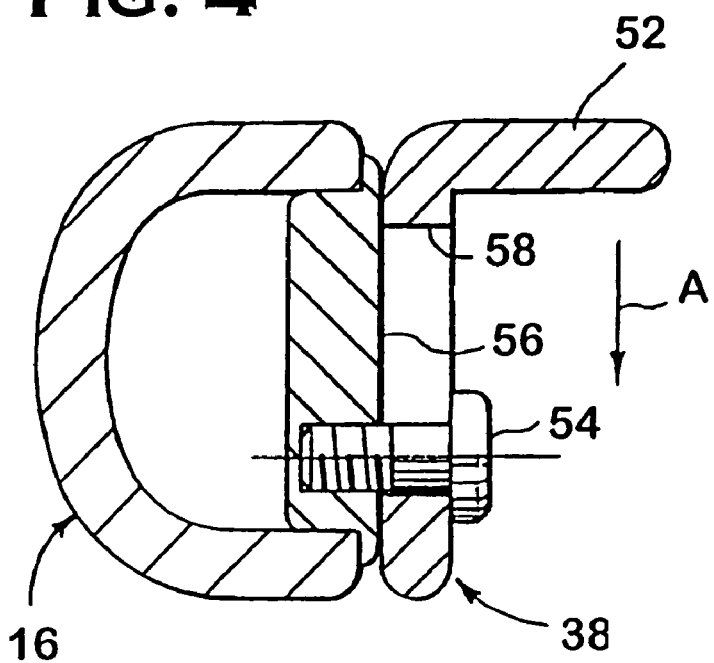
FIGS. 4 and 5 are cross sections according to the line IV-IV of FIG. 1 in two operating positions.
Figure 5:
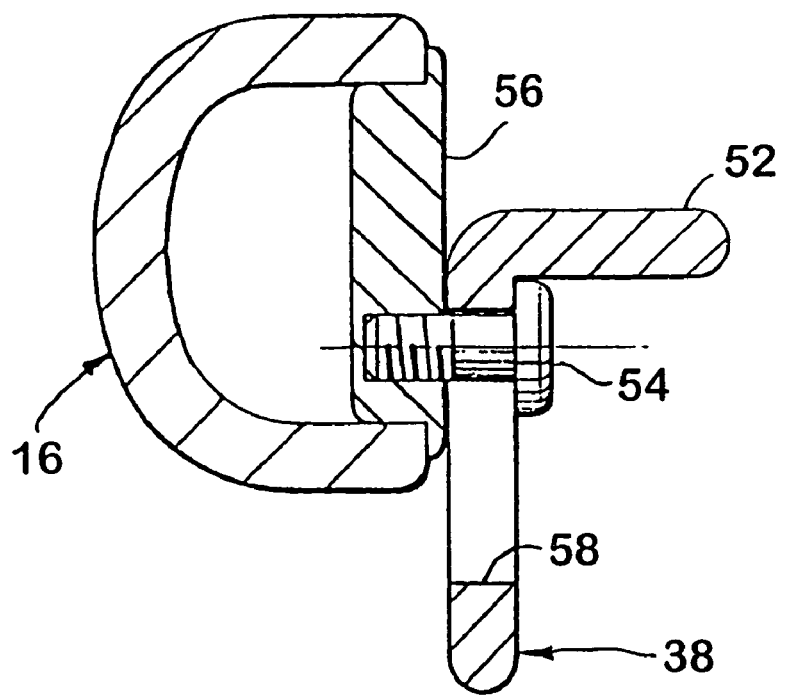

Preferably, the gear lever 38 is associated to an arrest device which limits the range of oscillation of the lever 38, in order to prevent damage to the switch 24. As is illustrated in greater detail in FIGS. 4 and 5, the said arrest device comprises a pin 54 fixed to a plate 56, which in turn is fixed to the brake lever 16, on the surface of the latter that faces the handlebars 14. The pin 54 engages with play a groove 58 made in the gear lever 38. FIG. 4 illustrates the gear lever in the resting position, in which the tab 50 constituting the portion for actuating the switch 24 is set facing, and at a slight distance from, the switch 24. To issue a command for gear change, the user acts manually on the tab 52, causing the control lever 38 to oscillate in the direction indicated by the arrow A in FIG. 4. FIG. 5 illustrates the position of maximum oscillation of the lever 38, defined by the impinging of the pin 54 upon the end of the groove 58. In this position, the tab 50 actuates the switch 24, which controls gear change. As illustrated in FIG. 2, the tab 50 of the gear lever 38 which operates the switch 24 can have an extension whereby it is facing the switch 24 even when the brake lever 16 is in the braking position. In this way, the cyclist has the possibility of changing gears even while he is applying the brakes. Gear change in the opposite direction is by exerting pressure on the push-button 32 in a direction orthogonal to the plane of representation of FIG. 3, so as to cause said push-button to oscillate in a direction to which there corresponds operation of the switch 26.

In particular, according to a further aspect of the invention, the lever 38 could be eliminated, and the switch 24 could have its push-button set in such a way that it can be operated directly. In this case, the invention would present even so its innovative characteristic consisting in the fact that the electrical switches are all carried by the supporting plate 28, so that they can be pre-assembled on the plate and then be simultaneously arranged in their final positions by simply mounting the plate on the body 12 for supporting the brake lever.

I claim:

1. A handlebar mounted bicycle control system comprising:
   a support body adapted for mounting on a bicycle handlebar and defining an interior space having exterior walls extending outwardly from the handlebar;
   a brake lever rotatably connected to the support body for rotation through a path of motion;
   first and second electrical switches located in the support body fixed with respect to the lever when the brake lever rotates through the path of motion;
   an electrical motor for controlling a gear change in communication with the first and second electrical switches and being operatively associated with a bicycle derailleur, wherein the electrical motor increases a gear ratio when one of the first and second electrical switches is activated and decreases the gear ratio when another one of the first and second electrical switches is activated;
   a control lever mounted for rotation about a pin located in the support body and positioned such that when the control lever rotates, the control lever contacts and activates the first electrical switch; and
   a button disposed on the support body for activating the second electrical switch.

2. The control system of claim 1 wherein the control lever rotates in a direction generally orthogonal to the path of motion to bring the control lever portion into activating contact with the first electrical switch.

3. The control system of claim 1, wherein the first and second electrical switches are located on opposite sides of a one-piece plate disposed in the support body.

4. The control system of claim 3, further comprising a third electrical switch disposed on the plate and being in communication with a cycle computer.

5. The control system of claim 3, wherein the plate is positioned in the support body so that the opposite sides are generally parallel to the exterior walls.

6. The control system of claim 1, further comprising a third electrical switch disposed in the support body and in communication with a cycle computer.

7. The control system of claim 1, further comprising:
   the brake lever being pivotally attached to the support body about a pivot axis; and
   the button being attached to the support body for movement about an axis that is generally orthogonal to the pivot axis.

8. The control system of claim 1, wherein the control system comprises two support bodies attached to the handlebar, with each associated with a separate derailleur.

9. The control system of claim 1, wherein the brake lever is rotatably attached to the support body about a pivot axis, the control lever being pivotally mounted to the brake lever about an axis generally perpendicular to the pivot axis.

10. A control system for a bicycle having a handlebar, comprising:
  a support body adapted for positioning on the handlebar:
  a brake lever rotatably connected to the support body for rotation through a path of motion;
  a one-piece plate disposed in the support body and having first and second major surfaces;
  a first electrical switch located on the first major surface;
  a second electrical switch located on the second major surface;
  an electrical motor for controlling a gear change in communication with the first and second electrical switches and being operatively associated with at least one of a front derailleur and a rear derailleur, wherein the electrical motor increases a gear ratio of the bicycle when one of the first and second electrical switches is activated and decreases the gear ratio when another one of the first and second electrical switches is activated;
  a control lever having a portion located within the support body, the control lever positioned such that rotation of the control lever moves the control lever into activating contact with the first electrical switch; and
  a button disposed on the support body for activating the second electrical switch.

11. The control system of claim 10, wherein
  the control lever rotates in a direction generally orthogonal to the path of motion of the brake lever.

12. The control system of claim 10, further comprising a third electrical switch disposed on the plate and being in communication with a cycle computer.

13. The control system of claim 10, further comprising:
  the brake lever being pivotally attached to the support body about a pivot axis; and
  the button being attached to the support body for movement about an axis that is generally orthogonal to the pivot axis.

14. A motor driven derailleur control device adapted for mounting on a bicycle handlebar, the control device comprising:
  a support body having a portion thereof configured for mounting on the bicycle handlebar, an interior cavity, and exterior walls;
  a brake lever mounted to the support body for movement toward and away from the support body;
  a one-piece support plate located within the interior cavity of the support body;
  at least first and second electrical switches mounted on the support plate, each switch being operatively connected to a motor driven derailleur;
  a control lever mounted behind and in selective contact with the brake lever and in communication with a selected one of the first and second electrical switches, wherein the control lever engages the selected one of the first and second electrical switches to activate a first gear ratio change; and
  a gear change switch located on the exterior walls of the support body and in communication with another one of the first and second electrical switches, wherein the gear change switch engages the another one of the first and second electrical switches to activate a second gear ratio change.

15. A control system for a bicycle having a handlebar, the control system comprising:
  a support body having a portion thereof configured for mounting on the handlebar, an interior cavity, and exterior walls extending outwardly from the handle bar;
  at least first and second electrical switches disposed on a one-piece support plate located within the interior cavity of the support body, each switch being operatively connected to at least one of a front derailleur and a rear derailleur;
  a control lever that pivotably moves about the support body and selects one of the first and second electrical switches, wherein engagement of the control lever with one of the first and second electrical switches causes a first gear ratio change; and
  a gear change switch located on the exterior walls of the support body and in communication with another one of the first and second electrical switches, wherein engagement of the gear change switch with the another one of the first and second electrical switches causes a second gear ratio change.

16. The control system of claim 15, wherein the support plate is oriented so that the opposite sides thereof are generally parallel to opposing interior cavity walls in the support body.

17. The control system of claim 16, further comprising a third electrical switch disposed in the support body and in communication with a cycle computer.

18. The control system of claim 17, wherein the third electrical switch is disposed on the support plate.

19. The control system of claim 17, wherein the control system comprises two of the support bodies being attached to the handlebar so that the front derailleur and the rear derailleur are each controlled by a separate support body.

* * * * *